US008456464B2

(12) United States Patent
Hsu et al.

(10) Patent No.: US 8,456,464 B2

(45) Date of Patent: Jun. 4, 2013

(54) METHOD FOR DRIVING A LIQUID CRYSTAL DISPLAY MONITOR AND RELATED APPARATUS

(75) Inventors: Chin-Hung Hsu, Tao-Yuan Hsien (TW); Chu-Ya Hsiao, Hsinchu (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 838 days.

(21) Appl. No.: 12/402,504

(22) Filed: Mar. 12, 2009

(65) Prior Publication Data

US 2010/0188389 A1 Jul. 29, 2010

(30) Foreign Application Priority Data

Jan. 23, 2009 (TW) ............................... 98102913 A

(51) Int. Cl.
*G06F 3/038* (2006.01)
*G09G 3/36* (2006.01)

(52) U.S. Cl.
USPC ........................................... 345/212; 345/209

(58) Field of Classification Search
USPC ............... 345/212, 87–90, 94, 100, 204, 211, 345/209
See application file for complete search history.

(56) References Cited

U.S. PATENT DOCUMENTS

| | | | | |
|---|---|---|---|---|
| 7,327,344 | B2 * | 2/2008 | Asada et al. | 345/100 |
| 2004/0263466 | A1 * | 12/2004 | Song et al. | 345/100 |
| 2005/0219195 | A1 | 10/2005 | Yano | |
| 2007/0242019 | A1 * | 10/2007 | Jung et al. | 345/98 |

FOREIGN PATENT DOCUMENTS

| | | |
|---|---|---|
| CN | 101334971 A | 12/2008 |
| TW | I258727 | 7/2006 |
| TW | I292145 | 1/2008 |
| TW | 200811788 | 3/2008 |

* cited by examiner

*Primary Examiner* — Joseph Haley
*Assistant Examiner* — Andrew Sasinowski
(74) *Attorney, Agent, or Firm* — Winston Hsu; Scott Margo

(57) ABSTRACT

A method for driving a liquid crystal display monitor including a display panel with a plurality of pixels includes receiving image data which includes a plurality of image signals corresponding to the plurality of pixels, initiating a column inversion procedure for driving the display panel to display the image data, comparing the plurality of image signals during the column inversion procedure to generate a comparison result, and deciding whether to initiate a charge sharing function of the plurality of pixels according to the comparison result.

12 Claims, 8 Drawing Sheets

METHOD FOR DRIVING A LIQUID CRYSTAL DISPLAY MONITOR AND RELATED APPARATUS

BACKGROUND OF THE INVENTION

1. Field of the Invention

The present invention relates to a method for driving a liquid crystal display monitor and a related driving device, and more particularly, to a driving method and related driving device initiating a charge sharing function for decreasing power consumption when the liquid crystal display monitor is driven by a column inversion procedure.

2. Description of the Prior Art

The advantages of a liquid crystal display (LCD) include lighter weight, less electrical consumption, and less radiation contamination. Thus, LCD monitors have been widely applied to various portable information products, such as notebooks, mobile phones, PDAs, etc. In an LCD monitor, incident light produces different polarization or refraction effects when the alignment of liquid crystal molecules is altered. The transmission of the incident light is affected by the liquid crystal molecules, and thus magnitude of the light emitting out of the liquid crystal molecules varies. The LCD monitor utilizes the characteristics of the liquid crystal molecules to control the corresponding light transmittance and produces gorgeous images according to different magnitudes of red, blue, and green light.

Please refer to FIG. 1, which is a schematic diagram of an LCD monitor 10 according to the prior art. The LCD monitor 10 includes a display panel 100, a timing controller 102, a source driver 104, and a gate driver 106. The display panel 100 is constructed by two parallel substrates, and the liquid crystal molecules are filled up between these two substrates. One of the substrates includes a plurality of data lines D1~Dm and a plurality of gate lines G1~Gn that are perpendicular to the data lines D1~Dm. The display panel 100 has thin film transistors (TFT) 114 installed in each intersection of the data lines D1~Dm and gate lines G1~Gn. In other words, the TFTs 114 are arranged in a matrix format on the display panel 100. The data lines D1~Dm correspond to columns of the LCD monitor 10, the gate lines G1~Gn correspond to rows of the LCD monitor 10, and each of the TFTs 114 corresponds to pixels P11~Pmn. In addition, the two substrates of the display panel 100 filled up with liquid crystal molecules can be considered as an equivalent capacitor 116.

The operation of the prior art LCD monitor 10 is described as follows. The timing controller 102 generates corresponding control signals and clock signals according to image data desired to be displayed on the display panel 100. According to the signals received from the timing controller 102, the source driver 104 and the gate driver 106 then respectively generate driving signals and gate signals to corresponding data lines and gate lines, for turning on the TFTs 114 and keeping a voltage difference of the equivalent capacitors 116, to change the alignment of liquid crystal molecules and light transmittance, so that the image data can be displayed in the display panel 100. For example, the gate driver 106 outputs a pulse to the gate lines G1~Gn for turning on the TFTs 114. Therefore, the driving signals generated by the source driver 104 can be inputted to the equivalent capacitor 116 through the data lines D1~Dm and the TFTs 114, and then the voltage difference kept by the equivalent capacitor 116 can adjust a corresponding gray level of the related pixel. In addition, a magnitude of each of the driving signals inputted to the data lines D1~Dm corresponds to different gray levels.

If the LCD monitor 10 continuously uses a positive voltage to drive the liquid crystal molecules, the liquid crystal molecules will not quickly change a corresponding alignment according to the applied voltages as before. Thus, the incident light will not produce accurate polarization or refraction, and the quality of images displayed on the LCD monitor 10 deteriorates. Similarly, if the LCD monitor 10 continuously uses a negative voltage to drive the liquid crystal molecules, the liquid crystal molecules will not quickly change a corresponding alignment according to the applied voltages as before. Thus, the incident light will not produce accurate polarization or refraction, and the quality of images displayed on the LCD monitor 10 deteriorates. In order to prevent the liquid crystal molecules from being polarized, the LCD monitor 10 must alternately use positive and the negative voltages to drive the liquid crystal molecules.

Please refer to FIG. 2 and FIG. 3, which are schematic diagrams of a column inversion procedure according to the prior art. Blocks 20 and 30 show polarities of pixels in the same part of two successive image frames. Comparing the blocks 20 and 30, when the display panel 100 is driven by the column inversion procedure, polarities of pixels in a column are uniform and change to opposite polarities as a frame changes. Note that polarities of pixels in different columns are opposite. Since polarities of pixels in a same column are uniform, the display panel 100 driven by the column inversion procedure has the advantages of low power consumption. However, the display panel 100 driven by the column inversion procedure still has the shortcomings of high power consumption in certain frames, which causes a heat problem in the display panel 100 of the LCD monitor 10.

Please refer to FIG. 4, which is a schematic diagram of driving voltage signals of the data lines D1~Dm outputted by the source driver 104 in the same frame during the column inversion procedure. In FIG. 4, the transverse axle represents time, the vertical axle represents voltage level, Vs indicates a maximum driving voltage, and the data lines D1~Dm are divided into positive odd data lines (D1, D3, . . . , and Dm-1) and negative even data lines (D2, D4, . . . , and Dm). The maximum and minimum voltage of the negative data lines (D2, D4, . . . , and Dm) are Vs/2 and 0 respectively, and the maximum and minimum voltage of the positive data lines (D1, D3, . . . , and Dm-1) are Vs and Vs/2 respectively. As can be seen, the source driver 104 provides Vs/2 for the negative data lines (D2, D4, . . . , and Dm) to receive the maximum and minimum voltage in the same polarity when the display panel 100 performs the column inversion procedure. Similarly, the source driver 104 provides Vs/2 for the positive data lines (D1, D3, . . . , and Dm-1) to receive the maximum and minimum voltage in the same polarity. Therefore, the data lines of the same polarity can have a voltage change of Vs/2. Meanwhile, the LCD monitor 10 has the largest loading since the source driver 104 consumes the largest power at this point of time, which causes a heat and power consumption problem in the source driver 104.

SUMMARY OF THE INVENTION

Therefore, the present invention provides a method for driving a liquid crystal display monitor and related driving device, to decrease power consumption.

The present invention discloses a method for driving a liquid crystal display monitor including a display panel with a plurality of pixels. The method comprises receiving image data, which includes a plurality of image signals corresponding to the plurality of pixels, initiating a column inversion procedure for driving the display panel displaying the image data, comparing the plurality of image signals during the column inversion procedure to generate a comparison result, and deciding whether to initiate a charge sharing function of the plurality of pixels according to the comparison result.

The present invention further discloses a liquid crystal display monitor with a charge sharing function during a column inversion procedure. The liquid crystal display monitor comprises a timing controller for receiving image data including a plurality of image signals, and transforming a format of the image data in order to output a signal, a display panel for displaying the image data, a source driver for receiving the signal to drive the display panel, and a gate driver for receiving the signal to drive the display panel, wherein the timing controller decides whether to transmit a charge sharing signal to the source driver according to the plurality of image signals.

The present invention further discloses a driving device for driving a liquid crystal display monitor including a display panel with a plurality of pixels. The driving device comprises a receiving unit for receiving image data, which includes a plurality of image signals corresponding to the plurality of pixels, a driving unit for initiating a column inversion procedure for driving the display panel to display the image data, a comparison unit for comparing the plurality of image signals during the column inversion procedure to generate a comparison result, and a charge sharing unit for deciding whether to initiate a charge sharing function of the plurality of pixels according to the comparison result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
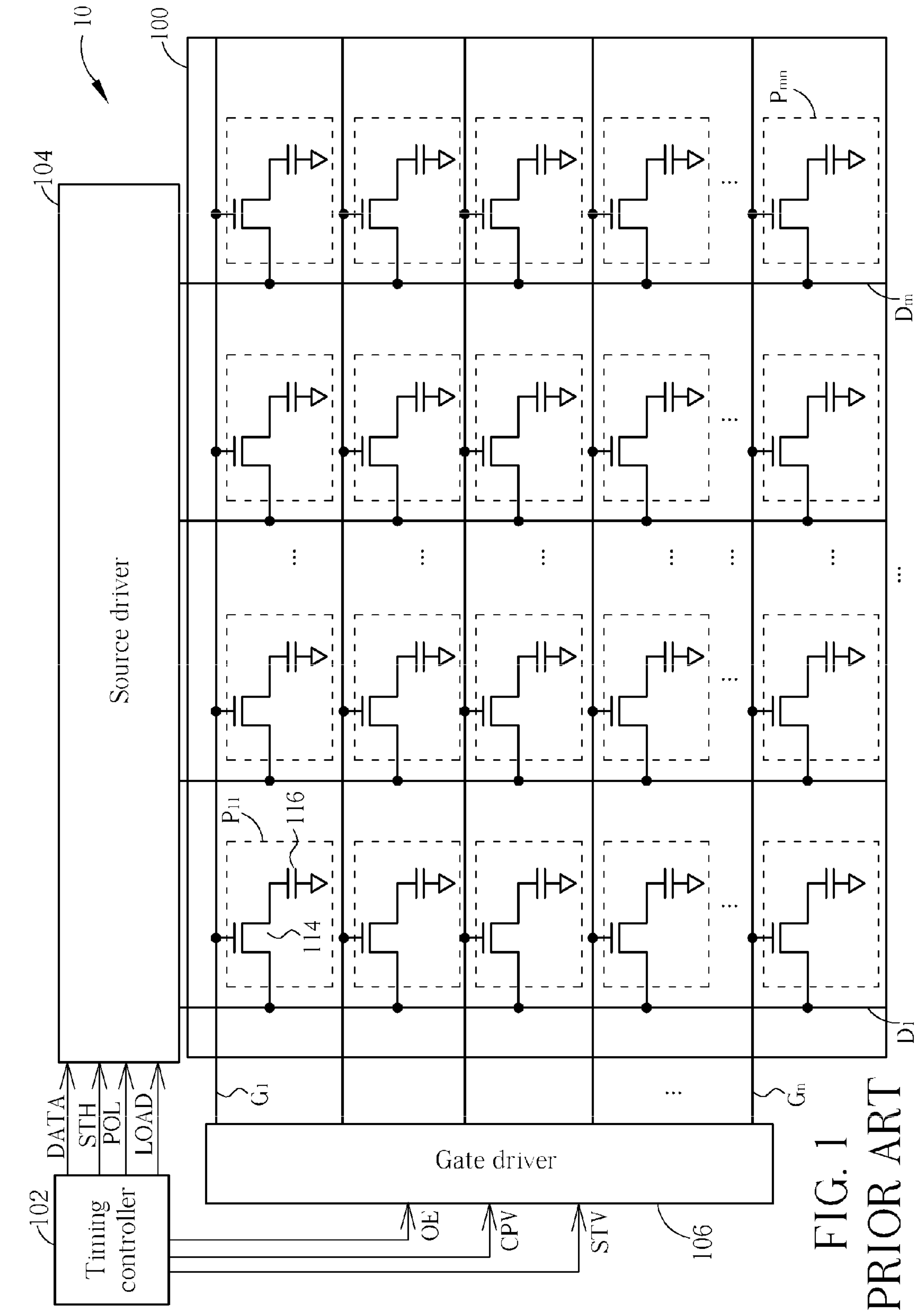
FIG. 1 PRIOR ART
FIG. 1 is a schematic diagram of an LCD monitor according to the prior art.
Figure 2:
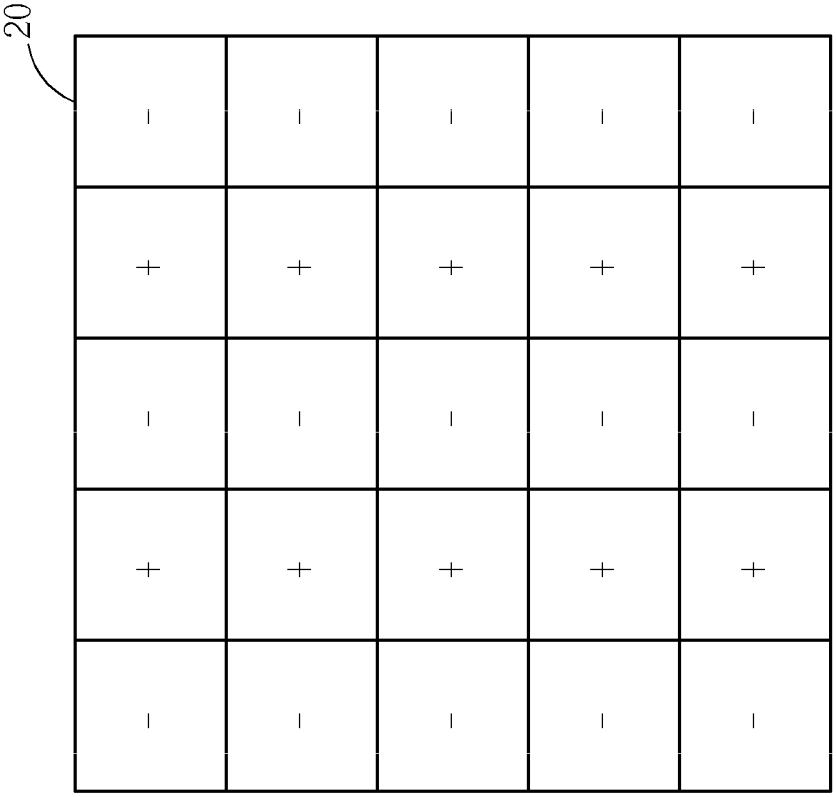
FIG. 2 PRIOR ART
FIG. 2 and FIG. 3 are schematic diagrams of a column inversion procedure according to the prior art.
Figure 3:
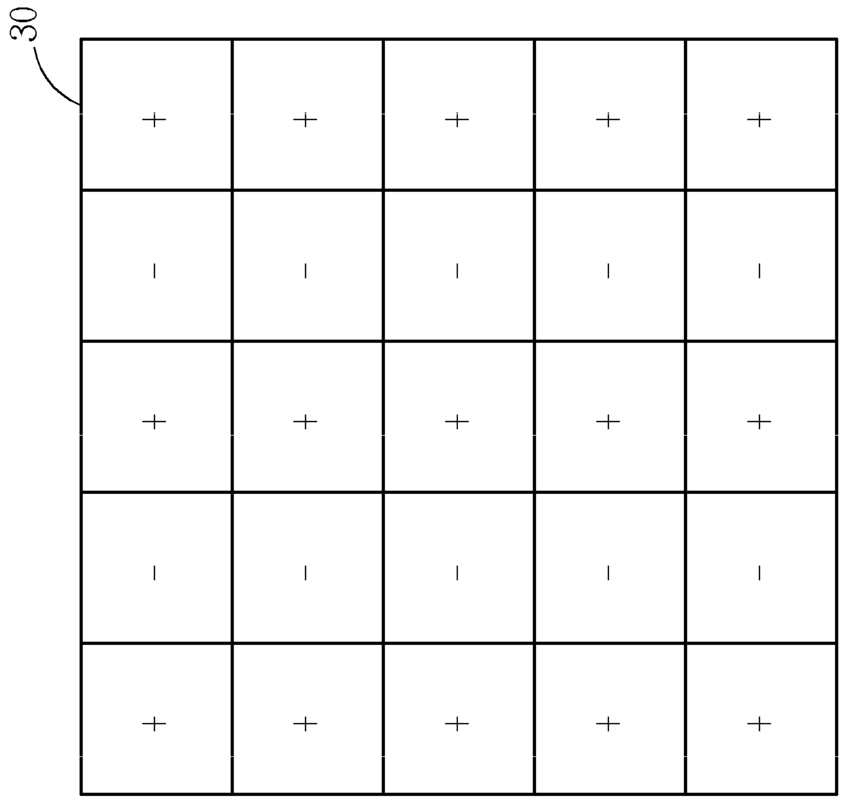
FIG. 3 PRIOR ART
Figure 5:
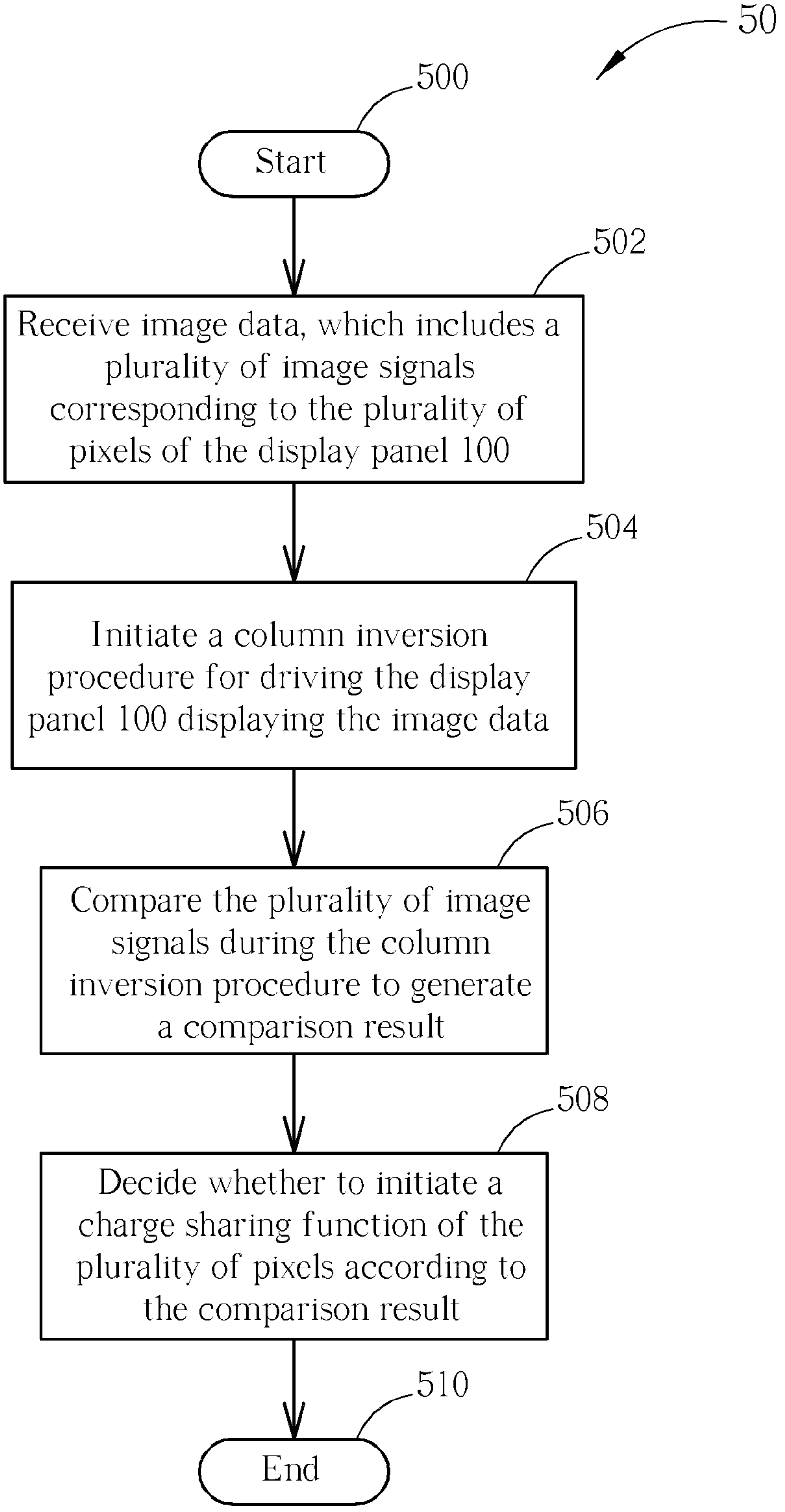
FIG. 5 is a schematic diagram of a process for driving an LCD monitor according to an embodiment of the present invention.

Please refer to FIG. 5, which is a schematic diagram of a process 50 according to an embodiment of the present invention. The process 50 is utilized for driving the LCD monitor 10 shown in FIG. 1, and comprises the following steps:

Step 500: Start.

Step 502: Receive image data, which includes a plurality of image signals corresponding to the plurality of pixels of the display panel 100.

Step 504: Initiate a column inversion procedure for driving the display panel 100 displaying the image data.

Step 506: Compare the plurality of image signals during the column inversion procedure to generate a comparison result.

Step 508: Decide whether to initiate a charge sharing function of the plurality of pixels according to the comparison result.

Step 510: End.

According to the process 50, the present invention decides whether to initiate the charge sharing function according to the comparison result of the image signals for decreasing the power consumption when the LCD monitor 10 is driven by the column inversion procedure.

In the same frame, the operation of the LCD monitor 10 driven by the column inversion procedure is described as follows. After the timing controller 102 of the LCD monitor 10 receives the image data, the timing controller 102 generates control signals to the source driver 104, and then the source driver 104 generates corresponding image signals corresponding to different data lines D1~Dm. The present invention compares the image signals corresponding to data lines D1~Dm, and decides whether to initiate the charge sharing function corresponding to the pixels according to the comparison result when the LCD monitor 10 performs the column inversion procedure, so as to decrease the driving voltage of the source driver 104 when the pixels perform voltage changes in the same polarity.

Figure 4:
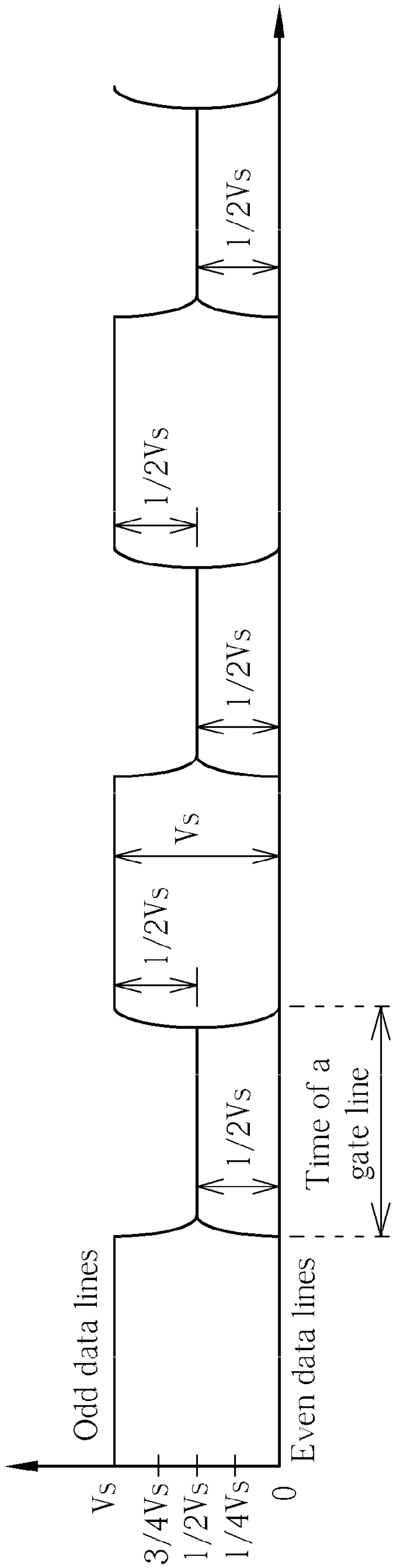
FIG. 4 PRIOR ART
FIG. 4 is a schematic diagram of driving voltage signals of data lines during the column inversion procedure.
Figure 6:
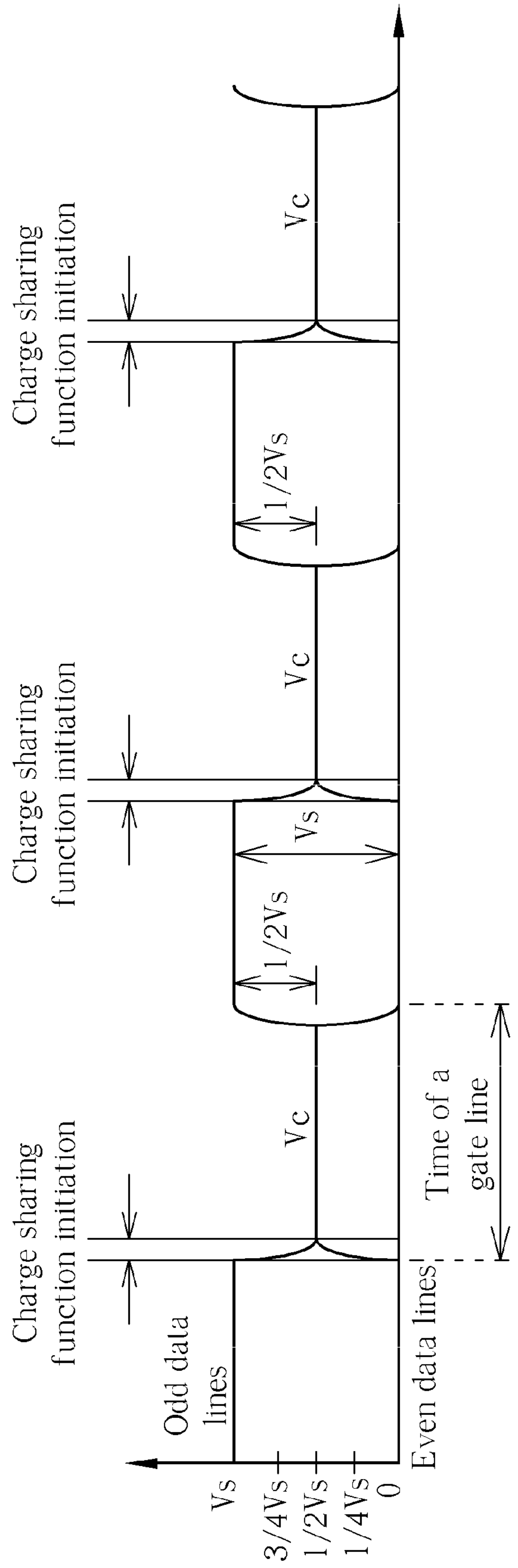
FIG. 6 is a schematic diagram of driving voltage signals of data lines according to an embodiment of the present invention.

Please refer to FIG. 6, which is a schematic diagram of driving voltage signals of data lines D1~Dm outputted from the source driver 104 according to the process 50. The source driver 104 generates image signals to different data lines D1~Dm when the LCD monitor is driven by the column inversion procedure, in which the data lines D1~Dm are divided into positive odd data lines (D1, D3, . . . , and Dm-1) and negative even data lines (D2, D4, . . . , and Dm). For clearer explanation of the present invention concept, please refer to FIG. 4, which is a schematic diagram of signals without the charge sharing function being initiated, as compared to FIG. 6, which is a schematic diagram of signals when the charge sharing function is initiated, for illustrating the differences between the present invention and the prior art. In the prior art, when the LCD monitor 10 performs the column inversion procedure, the source driver 104 provides the data lines D1~Dm with half of the maximum driving voltage Vs, so that the data lines D1~Dm have Vs/2 voltage change in the same polarity. In comparison, the LCD monitor 10 of the present invention initiates the charge sharing function according to the comparison result of the image signals. That is, voltage levels of the odd data lines (D1, D3, . . . , and Dm-1) and even data lines (D2, D4, . . . , and Dm) reach to a common voltage level Vc (about Vs/2) through the charge sharing function, so as to save the power of the negative data lines (D2, D4, . . . , and Dm) charging from the voltage level to the voltage level Vs/2. In this way, the source driver 104 does not need to provide an extra voltage to the negative data lines (D2, D4, . . . , and Dm) for realizing the voltage changes of the negative data lines (D2, D4, . . . , and Dm) in the same polarity, thereby saving power.

In addition, in order to correctly initiate the charge sharing function according to the comparison result of the image signals, the present invention preferably initiates the charge sharing function when the comparison result complies with the following conditions:

Condition 1: a voltage variety of the plurality of image signals corresponding to image signals of two adjacent rows in a column of the display panel 100 is equal to or greater than a first preset value. For example, if a voltage variety of the image signals of the gate lines G1 and G2 in the data line D1 is equal to or greater than the first preset value, the comparison result meets the condition 1. Then the next condition is determined. Note that the first preset value is preferably a quarter of the maximum driving voltage Vs.

Condition 2: a difference of a first absolute value of a first voltage variety of the plurality of image signals corresponding to image signals of two adjacent columns in a first row and a second absolute value of a second voltage variety of the plurality of image signals corresponding to image signals of two adjacent columns in a second row is equal to or greater than a second preset value. Note that the first row and the second row are adjacent rows. For example, if a difference (namely $|V1-V2|$) of an absolute value of a voltage variety (namely V1) of the image signals of the data lines D1 and D2 in the gate line G1 and an absolute value of a voltage variety (namely V2) of the image signals of the data lines D1 and D2 in the gate line G2 is equal to or greater than the second preset value, the comparison result meets the condition 2, and the charge sharing function is initiated. Note that the second preset value is preferably a half of the maximum driving voltage Vs.

In summary, the LCD monitor 10 of the embodiment of the present invention decides whether to perform the charge sharing function of the pixels according to the first preset value and the second preset value when the display panel 100 is driven by the column inversion procedure for displaying the image data. When the data lines D1~Dm are driven by the column inversion procedure, the charge sharing function is initiated according to the comparison result, which avoids the unnecessary initiation of the charge sharing function, and can decrease the power that the source driver 104 provides to the data line D1~Dm for voltage changes in the same polarity. Therefore, the power consumption is decreased, and the efficacy of saving power of the LCD monitor 10 is realized.

Figure 7:
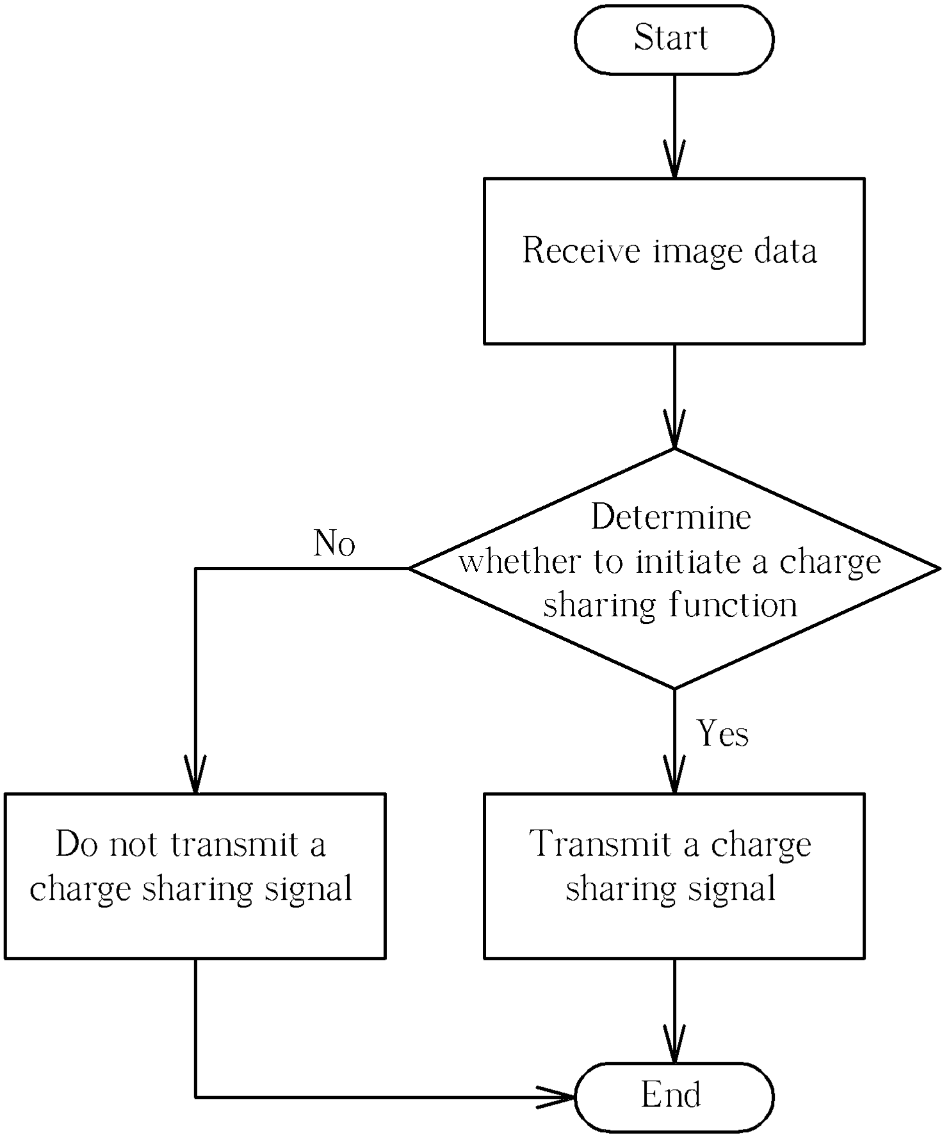
FIG. 7 is a block diagram of initiating a charge sharing function according to an embodiment of the present invention.

Please refer to FIG. 7, which is a block diagram of the LCD monitor 10 initiating a charge sharing function according to the process 50. The timing controller 102 of the LCD monitor 10 receives the image data including the plurality of image signals, and determines whether to transmit a charge sharing signal to the source driver 104 according to the plurality of image signals. If the source driver 104 receives the charge sharing signal, the charge sharing function of the plurality of pixels of the display panel 100 is initiated, and then the source driver 104 drives the display panel 100 to display the image data. If the source driver 104 does not receive the charge sharing signal, the charge sharing function of the plurality of pixels of the display panel 100 is not initiated, and then the source driver 104 directly drives the display panel 100 to display the image data. Note that the timing controller 102 determines whether to transmit the charge sharing signal to the source driver 104 according to condition 1 and condition 2. If condition 1 and condition 2 are met, the timing controller 102 transmits the charge sharing signal to the source driver 104. If condition 1 or condition 2 is not met, the timing controller 102 does not transmit the charge sharing signal to the source driver 104.

It should be noted that, in the prior art, when the LCD monitor 10 performs the column inversion procedure, the source driver 104 provides a half of the maximum driving voltage Vs, to enable the data lines in the same polarity to have a Vs/2 change. In comparison, the LCD monitor 10 of the present invention distributes charges of the data lines D1~Dm via the charge sharing function when the display panel 100 is driven by the column inversion procedure for displaying image data, to decrease the power provided by the source driver 104 and realize the efficacy of power saving.

Figure 8:
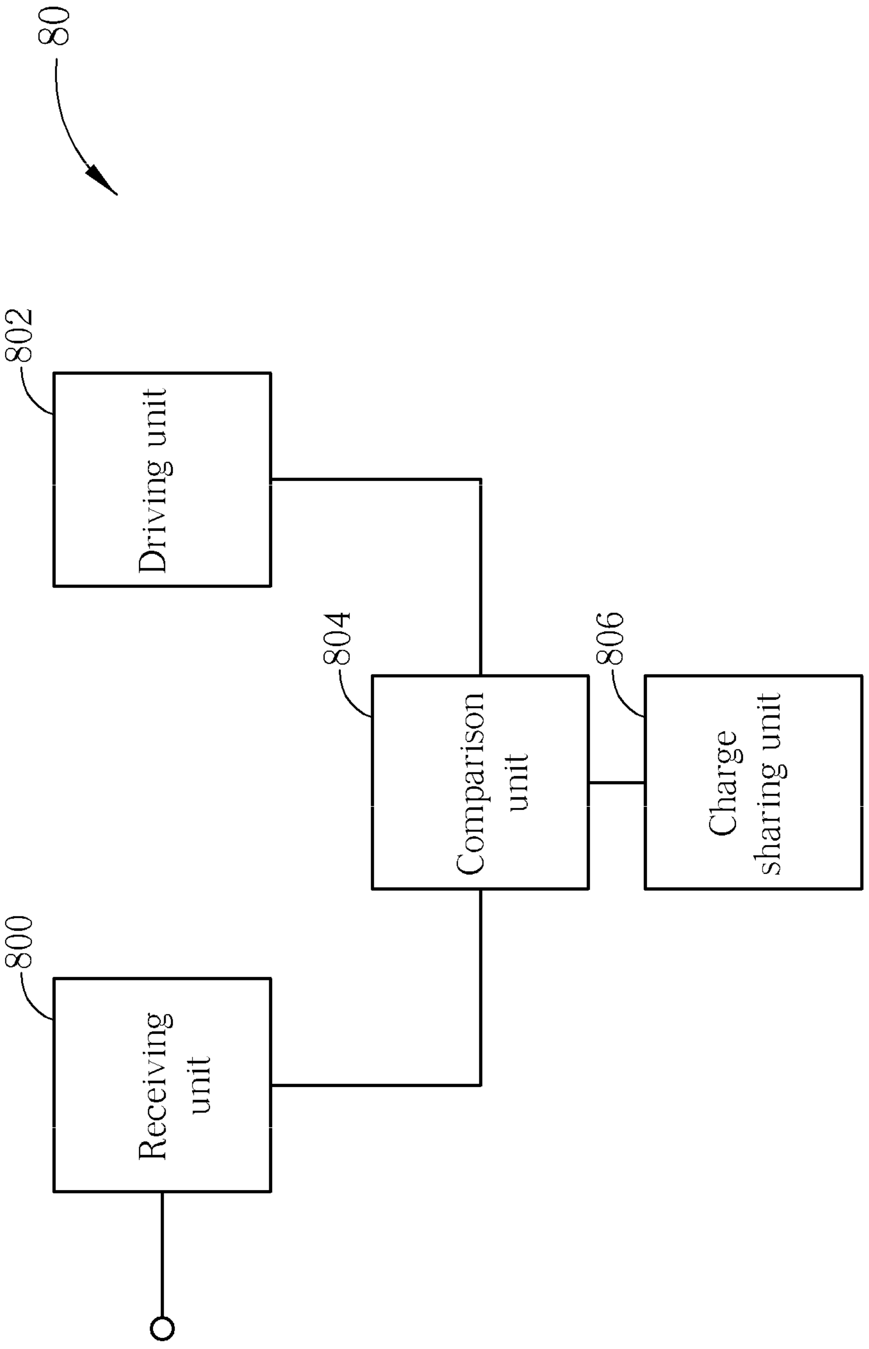
FIG. 8 is a schematic diagram of a driving device according to an embodiment of the present invention.

Those skilled in the art can use software or hardware realized in the timing controller 102 or the source driver 104 for realizing the process 50. For example, please refer to FIG. 8, which is a schematic diagram of a driving device 80 according to an embodiment of the present invention. The driving device 80 is set in the timing controller 102, which includes a receiving unit 800, a driving unit 802, a comparison unit 804, and a charge sharing unit 806. The driving device 80 is utilized for realizing the process 50, and the receiving unit 800, the driving unit 802, the comparison unit 804 and the charge sharing unit 806 are utilized for executing steps 502, 504, 506 and 508 respectively. The related description can be realized by referring to the above, so a detailed description is omitted herein.

In conclusion, the driving method of the present invention can decrease power consumption when the LCD monitor is driven by the column inversion procedure, to save power and improve the heat problem of the display panel.

Those skilled in the art will readily observe that numerous modifications and alterations of the device and method may be made while retaining the teachings of the invention.

What is claimed is:

1. A method for driving a liquid crystal display monitor including a display panel with a plurality of pixels, the method comprising:

receiving image data, which includes a plurality of image signals corresponding to the plurality of pixels;

initiating a column inversion procedure for driving the display panel displaying the image data;

comparing the plurality of image signals during the column inversion procedure to generate a comparison result; and deciding whether to initiate a charge sharing function of the plurality of pixels according to the comparison result;

wherein it is decided to initiate the charge sharing function of the plurality of pixels according to the comparison result when the comparison result complies with the following conditions:

a voltage difference of the plurality of image signals corresponding to image signals of two adjacent rows in a column of the display panel is equal to or greater than a first preset value; and a difference of a first absolute value of a first voltage difference of the plurality of image signals corresponding to image signals of two adjacent columns in a first row and a second absolute value of a second voltage difference of the plurality of image signals corresponding to image signals of two adjacent columns in a second row is equal to or greater than a second preset value.

2. The method of claim 1, wherein the first preset value is a quarter of a maximum driving voltage.

3. The method of claim 1, wherein the second preset value is a half of a maximum driving voltage.

4. The method of claim 1, wherein the first row and the second row are adjacent rows.

5. A driving device for driving a liquid crystal display monitor including a display panel with a plurality of pixels, the driving device comprising:

a receiving unit for receiving image data, which includes a plurality of image signals corresponding to the plurality of pixels;

a driving unit for initiating a column inversion procedure for driving the display panel to display the image data;

a comparison unit for comparing the plurality of image signals during the column inversion procedure to generate a comparison result; and a charge sharing unit for deciding whether to initiate a charge sharing function of the plurality of pixels according to the comparison result wherein the charge sharing unit decides to initiate the charge sharing function of the plurality of pixels when the comparison result complies with the following conditions:

a voltage difference of the plurality of image signals corresponding to image signals of two adjacent rows in a column of the display panel is equal to or greater than a first preset value; and a difference of a first absolute value of a first voltage difference of the plurality of image signals corresponding to image signals of two adjacent columns in a first row and a second absolute value of a second voltage difference of the plurality of image signals corresponding to image signals of two adjacent columns in a second row is equal to or greater than a second preset value.

6. The driving device of claim 5, wherein the first preset value is a quarter of a maximum driving voltage.

7. The driving device of claim 5, wherein the second preset value is a half of a maximum driving voltage.

8. The driving device of claim 5, wherein the first row and the second row are adjacent rows.

9. A liquid crystal display monitor with a charge sharing function, the liquid crystal display monitor comprising:

a timing controller for receiving image data including a plurality of image signals, and transforming a format of the image data in order to output a signal;

a display panel for displaying the image data;

a source driver for receiving the signal to drive the display panel; and a gate driver for receiving the signal to drive the display panel;

wherein the timing controller decides whether to transmit a charge sharing signal to the source driver according to the plurality of image signals when the following conditions are met:

a voltage difference of the plurality of image signals corresponding to image signals of two adjacent rows in a column of the display panel is equal to or greater than a first preset value; and a difference of a first absolute value of a first voltage difference of the plurality of image signals corresponding to image signals of two adjacent columns in a first row and a second absolute value of a second voltage difference of the plurality of image signals corresponding to image signals of two adjacent columns in a second row is equal to or greater than a second preset value.

10. The liquid crystal display monitor of claim 9, wherein the first preset value is a quarter of a maximum driving voltage.

11. The liquid crystal display monitor of claim 9, wherein the second preset value is a half of a maximum driving voltage.

12. The liquid crystal display monitor of claim 9, wherein the first row and the second row are adjacent rows.

* * * * *